Patented Jan. 2, 1923.

1,440,973

UNITED STATES PATENT OFFICE.

CLINTON E. DOLBEAR, OF SAN FRANCISCO, CALIFORNIA, ASSIGNOR TO INDUSTRIAL RESEARCH CO., OF SAN FRANCISCO, CALIFORNIA.

METHOD OF CONTROLLING FOAMING OF BOILING LIQUIDS.

No Drawing.    Application filed February 21, 1922.   Serial No. 538,385.

*To all whom it may concern:*

Be it known that I, CLINTON E. DOLBEAR, a citizen of the United States, residing in the city and county of San Francisco and State of California, have invented certain new and useful Improvements in Methods of Controlling Foaming of Boiling Liquids, of which the following is a specification.

My invention relates to a method of controlling the evaporation of liquids, which during concentration by boiling, have a tendency to foam.

Though my method is applicable to many such liquids, I have applied it, in actual practise, on a semi-commercial scale, to a natural potassium bearing brine; and have, by my method, evaporated, with the complete elimination of foaming, such a brine, carrying potassium and sodium chloride, sulphate, carbonate and borate together with organic matter that causes excessive foaming, the brine boiling, at any desired rate, without any trace of foam.

My method comprises essentially the boiling of the liquid in the presence of petroleum and chlorine. Petroleum will of itself materially reduce foaming, so, too, will chlorine, but when both are present, the foaming will be entirely stopped and boiling can be carried on at maximum rate.

In carrying out my method, I may use petroleum or any of its distillates. But obviously, the lighter distillates are better for the purpose, in avoiding gumming and other undesirable effects upon the evaporating vessel; and, of such distillates, for the sake of economy, I prefer, and would recommend, the use of what is commonly known as "slop distillate" or "tops" obtained as one of the so-called "cuts" in the distillation of petroleum. The chlorine may be the element itself or a chlorite or hypochlorite or a chlorate, or other chlorine compound equivalent.

The presence in the boiling liquid of the petroleum and the chlorine elements may be obtained in various ways. They may be added together; or the chlorine or chlorine compound may first be added and then the petroleum. In my practise, above referred to, I found that an efficient and economical procedure was to place in contact with a portion of the iron or steel surface of the containing vessel exposed to the boiling liquid, a sheet of lead thereby setting up a local electric current. In the liquid to be boiled I dissolved a soluble chloride. There was then, during the boiling sufficient chlorine or oxychloride liberated, due to the local electric current, to eliminate the foaming when the "slop distillate" was added to the boiling liquid. When once the foaming was under control, due to the chlorine, the maximum rate of boiling, without any foaming was maintained by adding a constant very small supply of the slop distillate.

I claim:—

1. The method of controlling the foaming of boiling liquids which comprises the boiling of such liquids in the presence of chlorine and petroleum.

2. The method of controlling the foaming of boiling liquids which comprises the generation, by an electric current, in the liquid during the boiling, of chlorine; and adding petroleum.

3. The method of controlling the foaming of boiling liquids, containing a chloride in solution, which comprises the establishment of a local electric current by the placing of lead in contact with the iron of the containing vessel, below the surface of the boiling liquid, whereby, during the boiling, chlorine is generated in the liquid; and adding petroleum.

In testimony whereof I have signed my name to this specification.

CLINTON E. DOLBEAR.